3,187,044
BROMIC ACID PROCESS FOR THE PREPARATION OF CERTAIN ALIPHATIC N-BROMO COMPOUNDS
Dale N. Robertson, Boulder, Colo., assignor to Arapahoe Chemicals, Inc., a corporation of Colorado
No Drawing. Filed May 21, 1962, Ser. No. 196,427
5 Claims. (Cl. 260—561)

This invention relates to the production of aliphatic N-bromo compounds and is concerned particularly with improved methods for the preparation of N-bromoacylamides, and certain other aliphatic N-brmo compounds.

N-bromo compounds are known as brominating agents and oxidizing agents in organic synthesis. These compounds enter into many of the same or similar reactions. However, their area of applicability is not identical. Thus, the aliphatic N-bromo compounds, especially the N-bromoacylamides, show specificity in certain reactions not shown by cyclic imides or amides. For example, in the field of steroid synthesis where N-bromo compounds are frequently used, N-bromoacetamide may be employed to effect a smooth oxidation of 3α-hydroxysteroids whereas N-bromosuccinimide is ineffective for this purpose. In other instances, N-bromoacetamide may be employed to add bromine preferentially to allylic compounds whereas N-bromosuccinimide gives only substitution at the α-carbon.

The N-bromoacylamides and other aliphatic N-bromo compounds have been prepared by methods common to the preparation of all N-bromo organic compounds, such as by brominating nitrogen organic compounds with bromine in strong alkali, bromine in strong alkali with chlorine or hypochlorite as oxidant, or bromine in acid with chlorine, hypochlorite or bromate as oxident. The known procedures have not always produced stable compounds in good yields. A measure of improvement was achieved on the discovery of the detrimental effects of alkali metal bromides and bromides in general and a process which avoided their formation. While such methods have found successful application in the production of many N-bromo compounds such as N-bromosuccinimide, 1,3 - dibromo - 5,5 - dimethylhydantoin, monobromo - 5 - ethyl-5-methylhydantoin, N-bromobenzamide, etc., they have not solved the problem of a number of aliphatic N-bromo compounds. Particularly problematic have been the N-bromo derivatives of acylamides, the glutarimides, and biuret derivatives such as N-bromoacetamide, N-bromoformamide, N-bromopropionamide, N-brombutyramide, N-bromovaleramide, N-bromo-caproamide, N-bromoglutarimide, N-bromo-β-methylglutarimide, dibromourea, dibromobiuret, etc. Thus, for example, N-bromoacetamide prepared by known processes has consistently discolored on standing. Moreover, the problem has been especially acute when the process has been scaled up from the laboratory scale to a plant scale. Other N-bromoacylamides and above named aliphatic N-bromo compounds have been obtained in such poor yields by known methods as to have precluded their economic usefulness as organic brominating or oxidizing agents even on a laboratory scale. The instability associated with N-bromoacetamide, the only N-bromoacylamide for which large-scale synthesis has even been attempted, has necessitated production be carried out only when the need is immediate and further, has necessitated shipping and storing under refrigeration, decomposition taking place at or near room temperature and becoming very rapid at temperatures over 80° F. It is apparent from the foregoing that there is a need for a method of production of N-bromoacylamides and certain other aliphatic N-bromo compounds as stable products and in reproducibly good yields, and which is adaptable to large-scale operation without detriment to the results obtained.

It has been the object of the present invention to provide a method whereby good yields of aliphatic N-bromo compounds of greatly increased stability may be prepared. It has been a further object to provide a method whereby consistent good yields of aliphatic N-bromo compounds may be prepared. A further object is a method which is adaptable to large-scale operations without sacrifice of good yields or stability. A still further object is to provide an improved method for producing N-bromoacylamides of greatly improved stability. An additional object is to provide an improved method for producing N-bromoacetamide of high stability. Another object is to provide a simple and reproducible method for producing N-bromoacetamide of good stability and good yields in a large-scale operation. Other objects will become apparent from the folowing specification and claims.

The expression "aliphatic N-bromo compounds" as herein employed is meant to designate N-bromoacylamides, containing from 1 to 6 carbon atoms, N-bromoglutarimide, N-bromo-β-methylglutarimide, dibromourea and dibromobiuret. The expression "aliphatic nitrogen compounds" will be employed to designate unbrominated precursors of the aliphatic N-bromo compounds.

According to the present invention, it has been discovered that good yields of aliphatic N-bromo compounds of highly increased stability may be prepared by mixing together substantially pure aqueous bromic acid and the appropriate aliphatic nitrogen compound and adding bromine to the resulting mixture. The reaction may be represented by the following equation:

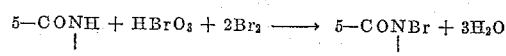

The free valences in the above formula are satisfied with such appropriate radicals as would result in the above defined aliphatic nitrogen compounds and the corresponding aliphatic N-bromo compounds.

The success of the present invention resides in the provision of an appropriate environment by a suitable combination of factors which, working together, render the process adaptable to accomplishing the good results which have not been accomplished by mere exclusion of detrimental agents or use of known processes.

To obtain the good results contemplated by the present invention, it has been found that it is critical and essential that the oxidizing agent be introduced as aqueous bromic acid and that it be of appropriate acid strength. Significant departure from the foregoing gives rise to loss in stability or yield of the product or both. To accomplish the good results, the bromic acid concentration must be at least 0.8 molar. The useful upper limit of bromic acid concentration appears to be about 1.5 molar. The preferred range of acid concentration is from about 0.9 molar to about 1.25 molar.

Aqueous bromic acid of appropriate high purity and appropriate strength may be prepared by a method which comprises passing aqueous solutions of certain bromate salts through a column containing a sulfonic acid cation exchange resin to exchange thereon a cation and thereafter washing or eluting the column with water to recover in the effluent substantially pure aqueous bromic acid. The pH of the effluent bromic acid will vary during the elution process from a pH greater than about 5 to a value less than 0.5 and thereafter increase to a value greater than 5. For an efficent process, the effluent having a pH greater than 0.5 is discarded, collection is made when the pH has dropped to about 0.5 and continued while the pH drops to a minimum and thereafter increases to 0.5 whereupon collection is terminated. The acid thus obtained is employed in the reaction as hereinafter described.

The bromate salts which are particularly suitable for the preparation of the bromic acid as above set forth include sodium bromate, cobalt bromate, magnesium bromate and calcium bromate. The above named bromate salts are employed in aqueous solutions of sufficient concentration so that the ion exchange process will produce bromic acid in a concentration in terms of acid strength of at least 0.8 molar without resort to concentration procedures. A salt concentration of from about 1.2 equivalents per liter to a saturated solution of bromate salt may be employed.

By the expression "sulfonic acid cation exchange resin" is meant a polymeric material having the capacity to exchange ions with the surrounding medium through the —$SO_3H$ group. The exchange resin may be completely synthetic and have a polymeric skeleton such as phenolformaldehyde resins, polystyrene or other poly(vinylaryl) compounds cross linked with from about 2 to 20 mole percent of a compound such as divinylbenzene having two unconjugated vinylidene groups, and the like. The exchange resin may also be those of natural materials which have been modified by chemical treatment such as sulfonated coal. Suitable for the process are commercially available resins such as the various Dowex 50 and 50W resins, Duolite C–20 and C–25 resins and cation exchange resins of polystyrene nuclear sulfonic acid type, available also with varying degrees of cross linking. Also suitable are methylene sulfonic acid cation exchange resins such as Duolite C–3 and C–10. The preferred mesh size of the resin is about 50–100.

For immediate or subsequent reuse, the column may be regenerated by first washing with water until the pH of the effluent has risen to 5 or 6 and thereafter, passing a strong acid solution, from about 5 to 40 percent by weight of strong mineral acid, preferably about 30 percent sulfuric acid, through the column at a rate of about 0.3 to 2 gallons per minute per square foot of column area and the column thereafter washed with water until the pH of the effluent has returned to approximately the same value as that of the wash water.

The bromic acid may be made by other methods but in any event such acid must equal in purity the acid prepared by the method herein described.

The bromic acid may be prepared as the first step in a substantially continuous operation and this comprises the preferred operating procedure. The acid may, however, be prepared ahead of time. Bromic acid prepared by the ion exchange process appears to retain suitable purity and concentration for several weeks if kept in the dark and in the cold.

In carrying out the preparation of the bromic acid, an aqueous solution of bromate salt is passed through a column containing a strongly acidic cation exchange resin preferably of the sulfonic acid type in the acid form and the cation of the appropriate salt is exchanged thereon. The exact rate of flow of the solution is not critical and the optimum rate depends in part on the size of the column; a rate of from about 0.3 to about 2 gallons per minute per square foot of bed is judged desirable for a column of from about 1 to 36 inches in diameter. Wide variance from this flow rate either reduces efficiency or significantly alters the composition and concentration of the effluent so as to render the acid unsuitable for the bromination step. Slow rates, while producing greater efficiency of exchange, may be less desirable from the economic standpoint by reason of loss in efficiency with respect to time, especially in large-scale operations. Where time is not critical, slower rates may be employed. As a result of the above operations, the sodium or other cation is exchanged on the resin to produce a salt form of the resin and bromic acid is formed which is carried down the column. After all of the solution of the metal bromate has been introduced into the column, water is applied to the column and allowed to percolate through the bed at the same flow rate to displace any bromic acid held on the surface or in the interstices of the resin particles. The effluent in the appropriate pH range is collected and the remainder discarded. The acid obtained by this method is substantially pure bromic acid. If precautions are observed as to collection in the appropriate pH range, the acid obtained is of proper concentration to be employed in the present invention. Sometimes, because of channeling resulting from improper packing, the bromic acid may contain a few mole percent of metallic cation. In this event, if the metallic cation content is not more than about 5 mole percent, the bromic acid obtained may still be used provided an amount of mineral acid at least equivalent to the cation content is added. Suitable mineral acids are nitric and sulfuric acids.

In carrying out the bromination, the bromic acid prepared as above described and the appropriate aliphatic nitrogen compound are mixed together and bromine is added slowly and with good mechanical stirring to the reaction mixture. The reaction is exothermic and cooling is employed to keep the reaction mixture at or below room temperature. In large-scale operations such as plant runs, where size of operation renders control more difficult, it is especially desirable that the temperatures be maintained in the range of from about 0° C. to about 30°. Efficient stirring and high acid conditions are required for a successful operation. The pH of the reaction mixture during the entire bromination should be below about pH 2 and is preferably kept at or below pH 1. Since both bromic acid concentration and pH are important in achieving desirable results, if there is borderline acidity at the beginning small amounts of bromic acid or some mineral acid such as nitric or sulfuric acid may be added to insure adequate acidity throughout the reaction. The reactants are employed in substantially stoichiometric amounts. A chloride catalyst, preferably hydrochloric acid, may be employed in a catalytic amount of about 0.1 to 2 percent by weight base on aliphatic nitrogen compound. Generally, bromine is added until reaction has become very slow as determined by the persistence of slight bromine color in the reaction mixture. In practice, this point is found to occur where the amount of bromine added is slightly less than stoichiometric. Thus, if bromine is added to the point of slight bromine color, bromine will be the limiting factor.

In a preferred method for carrying out the bromination, the appropriate aliphatic nitrogen compound is added to the bromic acid solution, prepared as above described, a catalytic amount of hydrochloric acid added thereto, and the mixture stirred and cooled while bromine is added. Stirring and cooling is continued until the addition of bromine has been completed. Thereafter, the mixture is chilled to complete the precipitation of the desired aliphatic N-bromo compound. The product is then recovered by filtration, decantation or centrifugation, washed with a small amount of ice water and dried. Substantially pure, white crystalline product containing essentially the theoretical amount of active bromine is obtained in good yield.

Products produced by the method of the present invention have increased stability and yield, and are obtainable with consistency of results not achieved by prior processes. The particular facets of the improvement are not necessarily manifested to an identical extent. Thus, with N-bromoacetamide, the greatest demonstration of unexpected superior properties are found in unprecedented stability and reproducibility of yield, although improved yield, higher melting point, etc. are noted. With N-bromoformamide, the primary advance is in increased yield. With the higher N-bromoaliphatic nitrogen compounds, namely, those of the acylamides, glutarimides, urea and biuret, there may be realized both improved stability and increased yield.

The following examples illustrate the invention but are not to be construed as limiting:

Example 1.—Preparation of bromic acid

A resin bed 1½ inches in diameter and 8½ inches long was prepared in a glass column, using 200 grams (wet weight; about 100 grams dry weight) of Dowex 50W-X8 (50-100 mesh), a sulfonic acid cation exchange resin, in the acid form. A solution of 33.2 grams (220 millimoles) of sodium bromate in 80 milliliters of water was passed through the column in a downward flow at a rate of 12.8 milliliters per minute, fractions collected and titrated to determine the bromic acid strength. The results are set forth in the following table:

| Fraction Number | Total Volume | Molarity | Total Acidity (milliequivalents) |
|---|---|---|---|
| 1 | 51 | 0.646 | 33.0 |
| 2 | 50 | 1.542 | 77.1 |
| 3 | 50 | 1.906 | 95.3 |
| 4 | 51 | 0.1084 | 5.53 |
| 5 | 50 | 0.00128 | 0.074 |

The molarity of the combined fractions is 0.834 molar indicating permissible acid strength of the entire collected effluent for the bromination step. In a preferred procedure, the first four fractions having a combined acid strength of 1.04 molar would be employed.

Example 2.—Preparation of bromic acid

In a representative operation, a column having an internal diameter of 24 inches and a height of 14 feet was packed with 22 cubic feet of the acid form of Dowex 50W-X8 ion exchange resin forming a resin bed 7 feet high. The column was washed with ice water until the temperature of the effluent reached 4° to 5° C. A solution of 300 pounds of sodium bromate in 150 gallons of water was fed to the column and permitted to percolate through at a flow rate of 1 gallon per minute per square foot of column area whereupon the sodium exchanged with the hydrogen of the sulfonic acid groups of the resin to form bromic acid which was taken off as effluent at a rate of about 3 gallons per minute. The pH of the effluent was checked and when the pH had dropped to 0.5, bromic acid collection was begun. After all the sodium bromate had feen fed onto the column, ice water was fed onto the column and the collection of bromic acid in the effluent was continued until the pH rose to 0.5 whereupon collection was terminated. The total bromic acid collected was 190 gallons. The bromic acid was titrated for hydrogen ion and bromate ion. It was found that the hydrogen ion concentration was 1.17 molar; the bromate concentration was 1.22 molar.

For bromination operations requiring larger amounts of bromic acid, the column is regenerated and the process repeated and the combined bromic acid solutions thus obtained used in the reaction.

In a representative operation regeneration was carried out by washing the column with water until the pH of the effluent had increased to 5 to 6. Three hundred pounds of concentrated sulfuric acid was poured over 600 pounds of ice and the resulting solution passed through the column at 1 gallon per minute per square foot of column area. The sulfuric acid solution was followed with water until the effluent was sulfate-free as determined with barium chloride test solution. As a result of these operations, the column was readied for further preparation of bromic acid.

Example 3.—N-bromoacetamide 1.43 M (molar) bromic acid solution was prepared in a manner similar to that above described.

59 grams (1 mole) of acetamide was dissolved in 136 milliliters of the above described bromic acid and 1.5 milliliters of concentrated hydrochloric acid added thereto. To the resulting mixture, bromine was slowly added over a period of about 2 hours while the mixture was stirred and cooled to maintain the temperature at about 20° C. After about 9 milliliters had been added, the desired N-bromoacetamide product began to precipitate in the reaction mixture and after 19 milliliters (0.37 mole) had been added, the reaction slowed down as indicated by the persistence of the bromine color in the reaction mixture. The mixture was then chilled to about 4° C. and maintained at that temperature for about 1 hour to complete the precipitation of the desired N-bromoacetamide product. The latter was recovered by filtration, washed with a small amount of water and dried in an oven at temperatures in the range of from about 45° to about 65° C. to obtain the desired product in a yield of 100 grams or 78 percent of theory. The product had an active bromine content of 57.9 percent as determined by iodometric titration; the theoretical value as 57.9 percent.

Example 4.—N-bromoacetamide

In a manner similar to that described in Example 1, a column was packed with about 150 grams (dry weight) of Dowex 50W-X8 resin in the acid form. A solution of 33.2 grams of sodium bromate in 80 milliliters of water was passed through the column, followed by water. About 40 milliliters of aqueous effluent had passed through the column before the effluent became acidic. The subsequent effluent containing bromic acid was collected in fractions and titrated for acid strength. There was recovered 195 milliliters of solution containing 0.198 mole of bromic acid for use in the bromination step.

52.3 grams (0.885 mole) of acetamide was mixed with the bromic acid above prepared while cooling to about 14° C., and 0.3 gram of sodium chloride added thereto as catalyst. Bromine was then added to the reaction mixture while the temperature was maintained at about 20° C. Bromine was introduced while cooling and stirring until 15.9 milliliters (47.6 grams; 0.298 mole) had been added and reaction had significantly slowed down. The reaction mixture was then stirred in an ice bath for about 1.5 hours and then filtered, the precipitate washed with ice water and dried to obtain the desired product having a melting point of 107°-108.5° C. in a yield of 73 percent. A sample of the product maintained in a sealed tube at 74° C. (165° F.) for 17 days showed no evidence of decomposition.

Example 5.—N-bromoacetamide

In a manner similar to that described in Example 2, bromic acid was prepared from 600 pounds (3.96 pound moles) of sodium bromate in two 300-pound runs through the ion exchange resin. The acid concentration was 1.13 molar and the bromate concentration 1.18 molar. A total of 390 gallons of bromic acid solution was collected, giving 3.84 pound moles.

1160 pounds (19.62 pound moles) of acetamide was dissolved in the bromic acid solution above prepared and 6 pounds of 12 normal hydrochloric acid catalyst and 35 pounds of nitric acid was added thereto to increase acid strength. The mixture was stirred and bromine added thereto. After about 500 pounds of bromine had been added to the mixture, the mixture was cooled, another 35 pounds of nitric acid was added to insure maintaining a pH below 1 and the addition of bromine continued until 1050 pounds (6.57 pound moles) had been added and a slight bromine color was seen, indicating a slowing down of the reaction. At the end of this time (about 3 hours), the mixture was chilled to complete the precipitation of the desired N-bromoacetamide product. The latter was collected by centrifugation, washed with a small amount of ice water and dried to obtain the desired product having a melting point of 105.5°-109.0° C. in a yield of 1774 pounds or 78.4 percent of theoretical.

Example 6.—N-bromoacetamide

In an operation carried out in a manner similar to that described in Example 5, employing 1050 pounds (17.75 pound moles) of acetamide, 3.60 pound moles of bromic acid and 1000 pounds (6.25 pound moles) of bromine, a 75.1 percent yield of N-bromoacetamide product was obtained having a melting point of 107.0–110.0° C.

*Example 7.—N-bromoformamide*

1.25 molar bromic acid solution was prepared in a manner similar to that previously described.

In a manner similar to that described in Examples 3 and 4, 84.5 grams (1.88 mole) of formamide was added to and mixed with 300 milliliters of the above prepared bromic acid, cooled, stirred and addition of bromine started. The reaction appeared to proceed slowly as indicated by the slow disappearance of bromine color, so 1 milliliter of concentrated hydrochloric acid was added. The reaction was markedly accelerated. The addition of bromine was continued while the mixture was maintained in the temperature range of from about 10° to 15° C. After about 20 milliliters of bromine had been added another 1 milliliter of concentrated hydrochloric acid was added. After about 28 milliliters of bromine was added, the N-bromoformamide product started to precipitate in the reaction mixture. An additional 2 milliliters of concentrated hydrochloric acid was added and the addition of bromine continued until a total of 40 milliliters (120 grams; 0.75 mole) had been added. At the end of this period, the reaction mixture was cooled to 3.5° C., filtered and washed twice with ice water and dried overnight at room temperature to obtain the desired N-bromoformamide product in a yield of 116 grams or 50 percent of the theoretical. The product had an active bromine content of 64.0 percent; the theoretical value is 64.48 percent.

*Example 8.—N-bromopropionamide*

In a manner similar to that described in Example 1, a solution of 33.2 grams (0.220 mole) of sodium bromate in 80 milliliters of water is passed through a column of 200 grams (wet weight) of Dowex 50W–X8 at a rate of 13 milliliters per minute followed by water and the effluent having a pH of less than 0.5 collected to obtain 168 milliliters of a bromic acid solution of 1.25 molar.

73 grams (1 mole) of propionamide is stirred into the bromic acid above prepared and 1.5 milliliters of concentrated hydrochloric acid added thereto. The resulting mixture is stirred and cooled and 20.5 milliliters (64 grams; 0.4 mole) of bromine added slowly thereto. After completion of the addition, the mixture is maintained at about 4° C. for about 1 hour to complete the precipitation of the desired product. The mixture is filtered, washed with a small amount of ice water and dried to obtain a good yield of the desired N-bromopropionamide product having a bromine content of 52.7 percent.

*Example 9.—N-bromoglutarimide*

In a manner similar to that described in Example 1, a saturated aqueous solution of sodium bromate is passed through a Dowex 50W resin bed at a rate of about 12 milliliters per minute, followed by ice water at the same rate to obtain 138 milliliters of 1.45 molar bromic acid solution.

113 grams (1 mole) of glutarimide is stirred into the bromic acid above prepared and 1.5 milliilters of concentrated hydrochloric acid added thereto. The resulting mixture is stirred and cooled, and 20.5 milliliters (64 grams, 0.4 mole) of bromine added slowly thereto. After completion of the addition, the mixture is maintained at about 4° C. for about 1 hour to complete the precipitation of the desired product. The mixture is filtered, washed with a small amount of ice water and dried to obtain a good yield of the desired N-bromoglutarimide product of good stability and having a bromine content of 41.7 percent.

*Example 10*

In preparations carried out in a manner described in Examples 1 and 4, the following compounds are prepared:

N-bromobutyramide having a bromine content of 48.2 percent by mixing together and reacting 167 milliliters of 1.2 molar bromic acid (prepared by passing 100 milliliters of an aqueous solution containing 46.5 grams of cobaltous bromate through a sulfonic acid ion exchange resin in the hydrogen form, and thereafter eluting with water), 87 grams (1 mole) of butyramide, 1.5 milliliters of concentrated hydrochloric acid and 20.5 milliliters of bromine.

N-bromoacetamide having a bromine content of 57.9 percent by mixing together and reacting 154 milliliters of 1.3 molar bromic acid (prepared by passing 80 milliliters of an aqueous solution containing 33.2 grams of sodium bromate through a sulfonic acid ion exchange resin in the hydrogen form and thereafter washing with water), 59 grams (1 mole) of acetamide and 20 milliliters of bromine.

N-bromovaleramide having a bromine content of 44.5 percent by mixing together and reacting 167 milliliters of 1.2 molar bromic acid (prepared by passing 100 milliliters of an aqueous solution containing 42.8 grams of magnesium bromate through a sulfonic acid ion exchange resin in the hydrogen form and thereafter eluting with water), 101 grams (1 mole) of valeramide, 1.5 milliliters of concentrated hydrochloric acid and 20.5 milliliters of bromine.

N-bromo-β-methylglutarimide having a bromine content of 38.9 percent by mixing together and reacting 150 milliliters of 1.1 molar bromic acid (prepared by passing 100 milliliters of an aqueous solution containing 34.5 grams of calcium bromate through a sulfonic acid ion exchange resin in the hydrogen form and thereafter eluting with water), 127 grams (1 mole) of β-methylglutarimide, 1.5 milliliters of concentrated hydrochloric acid and 20.5 milliliters of bromine.

N-bromoformamide having a bromine content of 64 percent by mixing together and reacting 138 milliliters of 1.45 molar bromic acid (prepared by passing 80 milliliters of an aqueous solution containing 33.2 grams of sodium bromate through a sulfonic acid ion exchange resin in the hydrogen form and thereafter washing with water), 45 grams (1 mole) of formamide and 20 milliliters of bromine.

N,N'-dibromourea having a bromine content of 40.7 percent by mixing together and reacting 276 milliliters of 1.45 molar bromic acid (prepared by passing 160 milliliters of an aqueous solution containing 66.4 grams of sodium bromate through a sulfonic acid ion exchange resin in the hydrogen form and thereafter washing), 60 grams (1 mole) of urea and 3 milliliters of concentrated hydrochloric acid and 41 milliliters of bromine.

Dibromobiuret having an active bromine content of 61.3 percent by mixing together and reacting 308 milliliters of 1.3 molar bromic acid (prepared by passing 160 milliliters of an aqueous solution containing 66.4 grams of sodium bromate through a sulfonic acid ion exchange resin in the hydrogen form and thereafter washings with water), 59 grams (1 mole) of biuret and 3 milliliters of concentrated hydrochloric acid and 41 milliliters of bromine.

The products produced by this process, in general, have greatly improved properties over products produced by known processes. Of particular significance are the highly improved stability and purity of N-bromoacetamide, a reagent for which there is much need in organic synthesis. The improved properties do away with the necessity for preparing the material substantially immediately prior to use and for shipping under refrigeration as previously required. Comparative stability determinations were carried out. When samples of N-bromoacetamide products (a) prepared by the process of the present invention and (b) prepared by the best of the known processes, were placed in sealed tubes and maintained in an oven at 74° C. (165° F.) and observed, it was found that in two days, the N-bromoacetamide product prepared by the known process had completely decomposed with bromine vapors observable in the tube, whereas the N-bromoacetamide product prepared by the process of the present invention, even after seventeen days at this elevated temperature had undergone no decomposition.

Further evidence of high stability of the N-bromoacetamide product prepared by the method of the present invention was seen when approximately ½ pound samples in polyethylene bags were subjected to elevated temperatures. The bags of product were initially placed in an electric oven at 45° C. (113° F.) and observed two days later and found to have undergone no change; the temperature was then raised to 55° C. (131° F.) and maintained there for an additional four days and again no change was observed; the temperature was raised to 60° C. (140° F.) and maintained for 9 more days, when it was found that the bags were quite brown and brittle but on removal from the bags, the product was found still to be substantially white with only a very faint yellow cast where it has been in contact with the decomposed bags.

The process of the present invention has been found to give a reproducibility of results in the production of N-bromoacetamide not achievable by the prior known methods, especially when carried out on a large scale. Thus, it has been found that in operation carried out on a scale employing from about 500 to 1600 pounds of acetamide, and taking, for example, five successive plant runs, the yields by the methods of the known process were variable, whereas by the process of the present invention wherein the acetamide and bromic acid are admixed and bromine added thereto, improved and essentially constant yields were obtained, both when the yield was based on bromine consumed, limiting reactant, and when the yield was based on acetamide, the most expensive reactant. The comparison of yields by the two methods may be seen from the following table.

| Yield of Product Based on Bromine | | Yield of Product Based on Acetamide | |
|---|---|---|---|
| Known Process | Present Process | Known Process | Present Process |
| 49.0 | 77.1 | 42.4 | 63.2 |
| 72.2 | 77.4 | 57.5 | 64.4 |
| 43.1 | 80.0 | 35.4 | 65.7 |
| 61.9 | 78.4 | 49.4 | 65.5 |
| 60.5 | 79.6 | 48.0 | 64.9 |

The aliphatic N-bromo compounds of the present invention may be employed in organic syntheses in bromination and oxidation reactions. For example, N-bromoacetamide has been used for the preparation of a number of fluoro-bromo steroids by reacting unsaturated steroids with N-bromoacetamide and anhydrous hydrogen fluoride. Also in the field of steroids, N-bromoacylamides may be employed to oxidize 3α-hydroxy steroids to 3-keto steroids, or to effect selective bromination of cholesteryl esters. These steroids are intermediates in the preparation of cortisone and other medicinal compounds, vitamins and hormones, and are furthermore useful as pharmacological agents in the study of the mechanism of drug action.

I claim:

1. An improved method for producing an N-bromoacylamide selected from the group consisting of N-bromoacetamide and N-bromoformamide which comprises mixing together and reacting (a) the corresponding acylamide selected from the group consisting of acetamide and formamide, (b) subsequentially pure aqueous bromic acid and (c) bromine, wherein said bromic acid has an acid strength of at least 0.8 molar and is substantially free of metallic cations and anions other than those inherent in aqueous bromic acid, and wherein the pH of the reaction mixture is maintained below about pH 2.

2. An improved method for producing N-bromoacetamide which comprises mixing together and reacting acetamide, substantially pure aqueous bromic acid and bromine, wherein said bromic acid has an acid strength of at least 0.8 molar and is substantially free of metallic cations and anions other than those inherent in aqueous bromic acid, and wherein the pH of the reaction mixture is maintained below about pH 2.

3. An improved method for producing N-bromoacetamide which comprises
   (1) mixing together acetamide, substantially pure aqueous bromic acid and a catalytic amount of hydrochloric acid, wherein said aqueous bromic acid has an acid strength of from about 0.9 molar to about 1.25 molar and is substantially free of metallic cations and anions other than those inherent in aqueous bromic acid, and
   (2) adding bromine to the resulting mixture, wherein the mixture during the addition is maintained at a pH no greater than about pH 1.

4. An improved method for preparing N-bromoacetamide which comprises
   (1) passing an aqueous solution of a bromate salt through a column containing a sulfonic acid cation exchange resin in the hydrogen form to exchange thereon the salt cation for hydrogen ion,
   (2) passing water through the column to recover substantially pure aqueous bromic acid and collecting the same at a pH below about 0.5 and at a concentration of at least about 0.8 normal, wherein said bromic acid is substantially free of metallic cations and anions other than those inherent in aqueous bromic acid,
   (3) adding acetamide and a catalytic amount of hydrochloric acid to the recovered bromic acid, and
   (4) adding bromine to the resulting mixture.

5. An improved method for preparing N-bromoformamide which comprises mixing together and reacting formamide, substantially pure aqueous bromic acid and bromine, wherein the bromic acid has an acid strength of at least 0.8 molar and is substantially free of metallic cations and anions other than those inherent in aqueous bromic acid, and wherein the pH of the reaction mixture is maintained below about pH 2.

References Cited by the Examiner

UNITED STATES PATENTS 2,971,959  2/61  Waugh et al. _____ 260—561 X

OTHER REFERENCES

Calmon et al.: Ion Exchangers in Organic and Biochemistry, pages 26 and 640–641 (1957).

De Barry et al.: Inorganic Chemistry, pages 481–482 (1953), Longmans Green and Co.

Davies: Chemistry and Industry, pages 51–52 (Jan. 24, 1948).

Heslop et al.: Inorganic Chemistry, pages 381–382 (1960), Elsevier Pub. Co.

IRVING MARCUS, *Primary Examiner.*

D. T. McCUTCHEN, WALTER A. MODANCE,
*Examiners.*